United States Patent
Guinart et al.

(10) Patent No.: US 10,212,565 B2
(45) Date of Patent: Feb. 19, 2019

(54) METHOD OF LOCATING A PLURALITY OF ELECTRONIC MEASURING MODULES MOUNTED IN THE WHEELS OF A MOTOR VEHICLE

(71) Applicants: CONTINENTAL AUTOMOTIVE FRANCE, Toulouse (FR); CONTINENTAL AUTOMOTIVE GmbH, Hannover (DE)

(72) Inventors: Nicolas Guinart, Toulouse (FR); Jean-Philippe Boisset, Montauban (FR); Olivier Fudulea, Toulouse (FR); Jean-Charles Huard, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/468,644

(22) Filed: Mar. 24, 2017

(65) Prior Publication Data

US 2017/0289732 A1 Oct. 5, 2017

(30) Foreign Application Priority Data

Mar. 31, 2016 (FR) ..................... 16 52806

(51) Int. Cl.
*H04W 4/70* (2018.01)
*B60C 23/04* (2006.01)
(Continued)

(52) U.S. Cl.
CPC .............. *H04W 4/70* (2018.02); *B60C 23/045* (2013.01); *B60C 23/0416* (2013.01);
(Continued)

(58) Field of Classification Search
CPC ...................................................... H04W 4/005
(Continued)

(56) References Cited

U.S. PATENT DOCUMENTS

| 2007/0090970 | A1* | 4/2007 | Watabe | ............... | B60C 23/0416 340/901 |
| 2008/0157950 | A1* | 7/2008 | Mori | ................... | B60C 23/0416 340/438 |

(Continued)

FOREIGN PATENT DOCUMENTS

| DE | 10 2007 063057 A1 | 7/2008 |
| FR | 2 892 550 A1 | 4/2007 |

(Continued)

OTHER PUBLICATIONS

FR Search Report, dated Nov. 18, 2016, from corresponding FR application.

*Primary Examiner* — Qutbuddin Ghulamali
(74) *Attorney, Agent, or Firm* — Young & Thompson

(57) ABSTRACT

Disclosed is a method of locating a plurality of electronic measuring modules mounted in the wheels of a motor vehicle. The method includes the steps of determination (E1) by each electronic measuring module of a set of proximity scores with respect to the other modules, sending (E2) by each module of the set of proximity scores to the electronic control unit, reception (E3) by an electronic control unit of the sets of proximity scores sent, and location (E4) of each module from the sets of proximity scores received.

3 Claims, 5 Drawing Sheets

(51) Int. Cl.
*B60C 19/00* (2006.01)
*H04L 29/08* (2006.01)
*H04W 4/02* (2018.01)

(52) U.S. Cl.
CPC .... *B60C 23/0433* (2013.01); *B60C 2019/004* (2013.01); *H04L 67/12* (2013.01); *H04W 4/023* (2013.01)

(58) Field of Classification Search
USPC ........................................................ 340/442
See application file for complete search history.

(56) References Cited

U.S. PATENT DOCUMENTS

2009/0085734 A1* 4/2009 Gila ...................... B60C 23/007
340/447
2010/0134262 A1* 6/2010 Lefaure ................ B60C 23/007
340/425.5
2014/0073260 A1* 3/2014 Bettecken ........... B60C 23/0416
455/66.1

FOREIGN PATENT DOCUMENTS

FR 2 915 927 A1 11/2008
FR 2 921 588 A1 4/2009

* cited by examiner

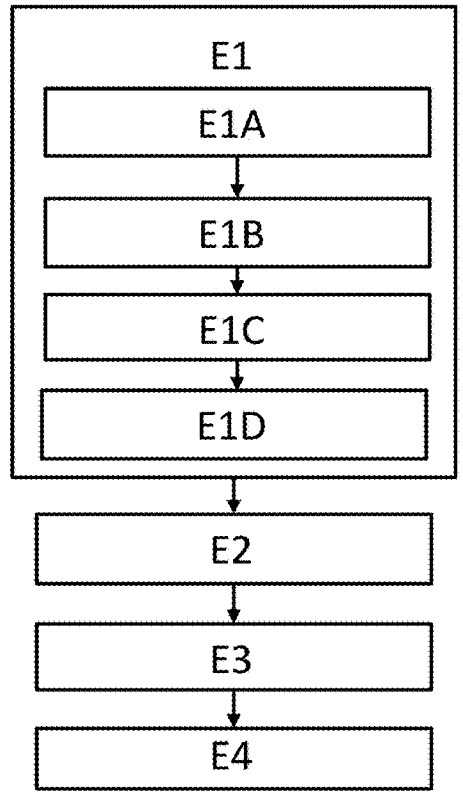
FIG. 3
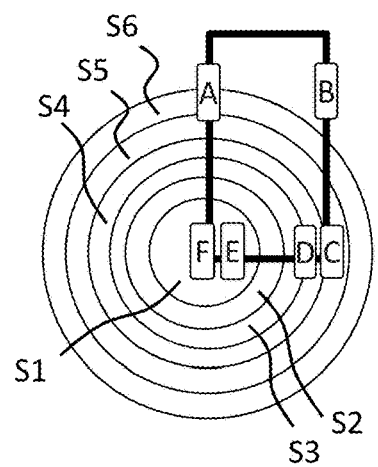
FIG. 5
FIG. 6

METHOD OF LOCATING A PLURALITY OF ELECTRONIC MEASURING MODULES MOUNTED IN THE WHEELS OF A MOTOR VEHICLE

FIELD OF THE INVENTION

The present invention relates to the field of communicating sensors mounted in the wheels of motor vehicles and more particularly concerns a method of locating a plurality of electronic measuring modules mounted in the wheels of a motor vehicle. The invention also concerns a system for measuring parameters associated with the wheels of a motor vehicle and a motor vehicle including a system of that kind.

BACKGROUND OF THE INVENTION

Nowadays, it is known to mount in each wheel of a motor vehicle an electronic measuring module comprising one or more sensors in order to monitor parameters
of the wheel and to detect an anomaly. Those sensors can for example be a tire inflation gas pressure sensor and/or a wheel acceleration sensor.

FIG. 1 shows a motor vehicle 1A including an electronic control unit 5A and a plurality of wheels 10A (six wheels in this example) in each of which an electronic measuring module 100A is mounted.

Each module 100A sends its measurements to the electronic control unit 5A which processes them to detect an anomaly and inform the driver of it. To this end, each electronic measuring module 100A sends the electronic control unit 5A over a radio link L1 signals in which are coded messages including the measurements and an identifier of the module 100A.

On starting the vehicle, the electronic unit 5A does not know the exact location of each module 100A but it is necessary for the electronic control unit 5A to be able to locate each module 100A of the vehicle 1A (left front wheel, right front wheel, etc.) in order to display on the dashboard information relating to a fault in one of the wheels such as, for example, a low tire pressure alarm, a slow leak from the tire, an anomaly of the electronic measuring module 10A of the wheel, etc.

In existing solutions, the electronic control unit 5A knows only the identifier of each module 100A that it receives in the measurement messages and does not know the location of each wheel.

A known solution for determining the location of the modules 100A consists in recognizing the signature of the radio-frequency power of each module 100A. A solution of this kind necessitates the electronic control unit 5A learning beforehand the signatures of the various electronic measuring modules 100A, which can prove significantly complex, time-consuming and costly. Moreover, this phase of configuring the electronic control unit 5A must be carried out for all the wheel positions for each vehicle type and variant, which represents a major disadvantage.

If the modules 100A include an accelerometer or a shock sensor, another known solution consists in programming the electronic control unit 5A so that it requests each module 100A to send a message when it is in a predetermined position relative to the wheel. A solution of this kind is complex and costly, however, because it requires the use of an accelerometer or a shock sensor. Moreover, a solution of this kind is not able to discriminate the positions of twinned wheels and proves equally ineffective for vehicles equipped with an integral transmission system, which again represents disadvantages.

SUMMARY OF THE INVENTION

The invention therefore aims to remedy at least some of these disadvantages by proposing a simple, reliable and effective solution to enable the electronic control unit to locate the electronic measuring modules in the vehicle.

To this end, the invention consists firstly in a method of locating a plurality of electronic measuring modules mounted in the wheels of a motor vehicle, said vehicle including an electronic control unit of said electronic measuring modules, said module comprising the steps of:
  determination by each electronic measuring module of a set of proximity scores with respect to the other modules,
  sending by each module of all the proximity scores that have been determined to the electronic control unit,
  reception by the electronic control unit of the sets of proximity scores that have been sent, and
  location of each module by the electronic control unit from the sets of proximity scores received.

By "location of each module" is meant determination of the wheel in which the module is mounted (right front wheel, left front wheel, etc.).

The electronic control unit uses the sets of proximity scores to determine the relative position of the modules. A map of this kind enables the electronic control unit to locate each of the electronic measuring modules in a simple, rapid, reliable and effective manner in order to inform the driver of a fault in one of the wheels of the vehicle. The method according to the invention makes it possible in particular to distinguish the left and right wheels in a twinned wheel pair, for example at the rear of a lorry. It proves equally effective for vehicles provided with an integral transmission system, such as 4×4 for example or other all-terrain vehicles or vehicles of SUV (Sport Utility Vehicle) type.

The determination by each electronic measuring module of a set of proximity scores with respect to the other modules is carried out turn and turn about by each module and comprises, for each module, the substeps of:
  sending by the module termed the sending module of an initialization message to the other modules, termed receiving modules, said initialization message being coded in radio-frequency signals sent, preferably periodically, at increasing power levels and including the identifier of the sending module,
  reception by each of the receiving modules of at least one initialization message sent by the sending module,
  sending by each of the receiving modules of at least one response message including the identifier of said receiving module,
  reception by the sending module of the response messages sent by each of the receiving modules in order to determine the set of proximity scores with respect to said receiving modules.

The initialization message is preferably coded in radio-frequency signals sent at different, increasing power levels. Alternatively, the initialization message is coded in radio-frequency signals sent at different power levels converging by dichotomy or decreasing power levels.

The initialization message is preferably sent more than once at the same power level by the sending module. Such repetition makes it possible to ensure that the sending module sends at least one message outside a zone preventing transmission (known as a "black spot"). These zones can correspond to different positions of the wheel in which the sending module is mounted for which the initialization message is never received by another receiving module (or at least by a receiving module liable to receive it at the same power in another position of the wheel). The fact of repeating this message several times while the wheel (and therefore the sender) is turning guarantees that statistically at least one message is sent in an adequate position in order to be received by the receiving module or modules present in the coverage area of the sending module.

Alternatively, other sending strategies could be used such as, for example, sending by dichotomy or by decreasing power levels.

For each sending power level, following the sending of the signals containing the initialization message, the sending module advantageously switches to a receiving mode for a predetermined time interval during which one or more response messages can be received from one or more respective receiving modules.

In a preferred embodiment, the sending module determines a proximity score for each receiving module following the reception of a response message sent by said receiving module, that score being a value corresponding to the power level at which the sending module sent the signals including the initialization message.

If the initialization message is sent more than once at the same power level, the receiving module can advantageously indicate in its response message the number of initialization messages received at a given power.

The proximity score of a receiving module is preferably determined from the first response message received corresponding to the sending of signals at the lowest power level by the sending module when the latter receives a plurality of response messages from said receiving module corresponding to a plurality of signals sent at different power levels.

In another embodiment, the response message sent by a receiving module includes information on the power at which the signals were received from the sending module.

This information can be the power at which the signals are received or a proximity score, for example as defined above. In the latter case, the sending module first inserts the value of its sending power in the initialization message, after which the receiving module measures the power at which it receives the signals including said initialization message, compares that measurement to the sending power in respect of which information is contained in the initialization message received, determines by calculation the proximity scores with respect to the sending module, and sends said score to the sending module in its response message.

The invention also concerns a system for measuring parameters associated with the wheels of the motor vehicle, said system comprising a plurality of electronic measuring modules each mounted in a wheel of the vehicle in order to measure parameters associated with said wheel and an electronic control unit of said electronic measuring modules, each electronic measuring module being configured to determine a set of proximity scores with respect to the other modules and to send said set of proximity scores that have been determined to the electronic control unit, said electronic control unit being configured to receive from each electronic measuring module a set of proximity scores and to determine the location of each module from said sets of proximity scores received.

Each module is configured to function in an initialization mode termed the "sender" mode in which the module sends an initialization message coded in radio-frequency signals sent at different, preferably increasing power levels to other modules, then termed receiving modules, said initialization message including the identifier of the sending module.

The sending module advantageously sends an initialization message coded in radio-frequency signals sent at different, increasing, decreasing or convergent by dichotomy power levels.

The sending module is preferably configured to send the initialization message periodically and to change the level for each period, for example.

Each of the receiving modules is advantageously configured to receive at least one initialization message sent by the sending module and to send at least one response message including at least the identifier of said receiving module and the sending module is advantageously configured to receive a response message from each receiving module in order to determine the set of proximity scores with respect to the receiving modules.

In a preferred embodiment, the sending module is configured to determine, as a function of the sending power level, a proximity score for each receiving module on receiving its response message.

The sending module is advantageously configured to determine the proximity score of a receiving module from the first response message received from said receiving module corresponding to the sending of signals at the lowest power level, if the latter responds to the sending module for sending a plurality of signals at various power levels.

In another embodiment, the response message includes information on the power at which the signals including the initialization message sent by the sending module were received.

This information can be the power at which the signals were received from the sending module or a proximity score, for example as defined above. In the latter case, the sending module is configured to insert the value of the sending power of the signals sent at a given level and the receiving module is configured to measure the power at which said signals were received, to compare that measurement to the sending power information on which is contained in the initialization message received, to determine by calculation the proximity scores with respect to the sending module and to send said score to the sending module.

The electronic measuring modules being disposed symmetrically relative to the longitudinal axis of the vehicle, the electronic control unit is preferably off-center relative to said longitudinal axis in order to be closer to one side of the vehicle than the other and to allow asymmetrical distances, in terms of power, between the two sides of the vehicle. This enables the electronic control unit to locate each of the electronic measuring modules in a precise and reliable manner, the modules on one side of the vehicle being nearer the electronic control unit in terms of power than the modules on the opposite side. In practice, a position of the electronic control unit is selected that, by ad-hoc off-centering, guarantees that the classification of the distances in terms of power corresponds to that of the distances in terms of length.

The invention also concerns a motor vehicle including a measuring system as described above.

BRIEF DESCRIPTION OF THE DRAWINGS

Other features and advantages of the invention will become apparent in the course of the following description given with reference to the appended figures provided by way of nonlimiting example and in which identical references are assigned to similar objects.

FIG. 3 shows diagrammatically one embodiment of the method according to the invention.

FIG. 5 is an example of six sets of proximity scores generated by the six electronic measuring modules of the vehicle from FIG. 2.

FIG. 6 shows diagrammatically an example of evaluation of the proximity scores for one of the electronic measuring modules of the vehicle from FIG. 2.

DETAILED DESCRIPTION OF THE INVENTION

The system according to the invention is intended to be mounted in a motor vehicle to measure parameters associated with the wheels of said vehicle.

Figure 1:
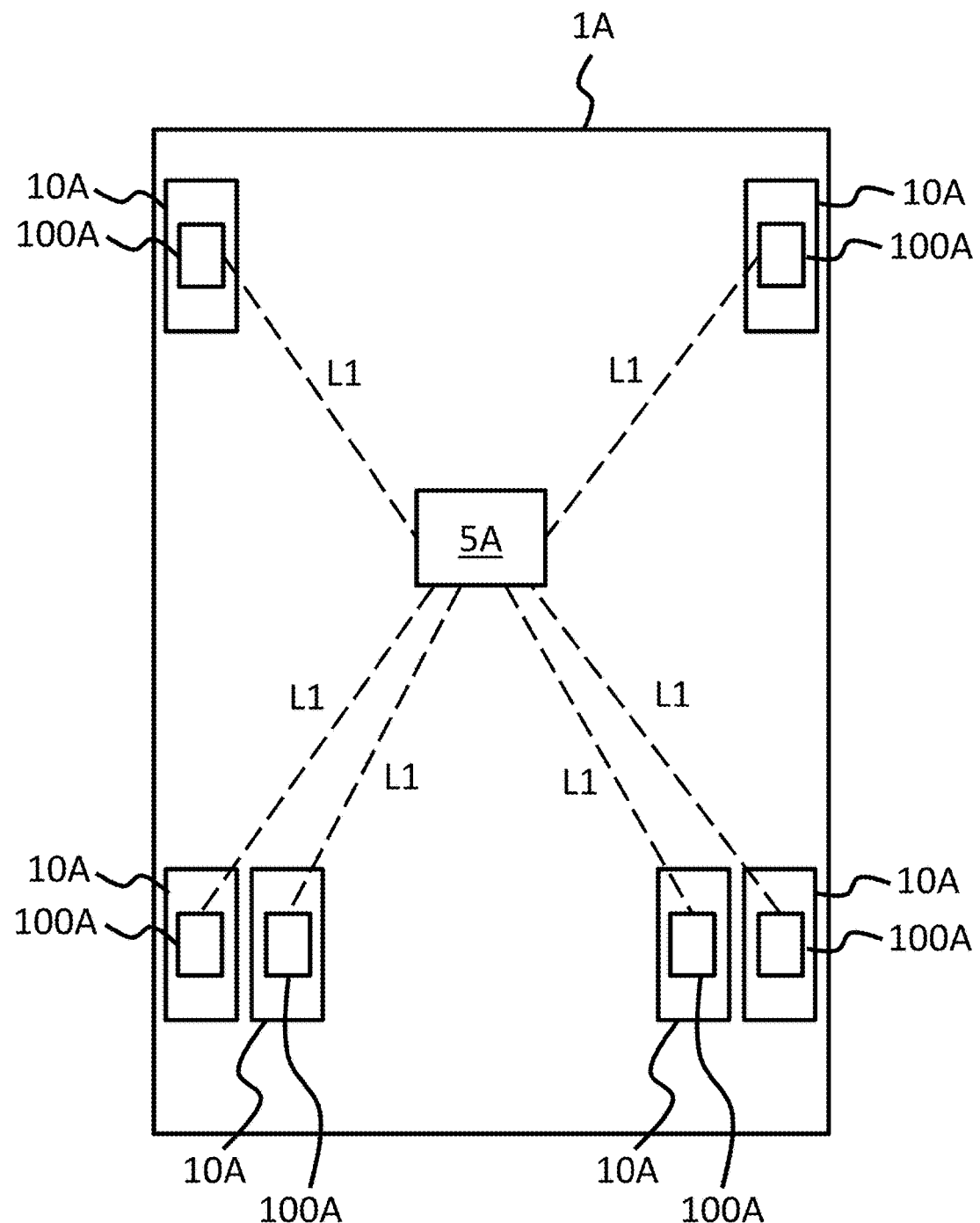
FIG. 1 (already commented on) shows diagrammatically one embodiment of a prior art vehicle.
Figure 2:
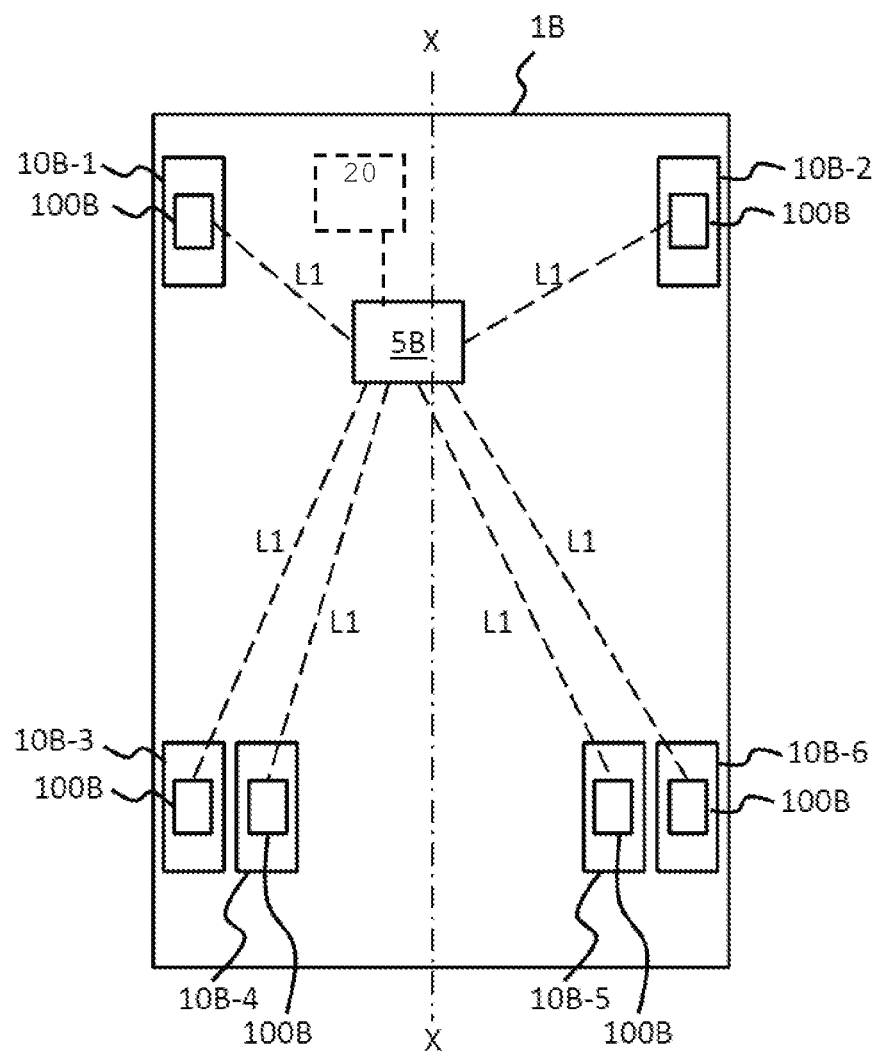
FIG. 2 shows diagrammatically one embodiment of a vehicle according to the invention.

FIG. 2 shows diagrammatically a motor vehicle 1B in order to illustrate the invention. By "motor vehicle" is meant a road vehicle powered by an explosion engine, an internal combustion engine, an electric motor or by a gas turbine or a hybrid drive system such as, for example, a car, a van, a lorry, a motorcycle with two or three wheels, etc.

This vehicle 1B includes an electronic control unit 5B and a plurality of wheels 10B. In this nonlimiting example the vehicle 1B has six wheels 10B but it goes without saying that the vehicle 1B could have more or fewer than six wheels 10B. In order to distinguish them according to their location, the wheels are referenced 10B-1, 10B-2, 10B-3, 10B-4, 10B-5 and 10B-6 in FIGS. 2, 4 and 6. The vehicle 1B therefore has two wheels 10B-1, 10B-2 at the front and two pairs of twinned wheels 10B-3, 10B-4 and 10B-5, 10B-6 at the rear.

In known manner each wheel 10B includes a rim (not shown) on which is mounted a tire (not shown) delimiting an interior inflation space between said rim and said tire in which an electronic measuring module 100B is mounted.

The electronic measuring module 100B and the electronic control unit 5B constitute the nodes of a radio communication system.

Each electronic measuring module 100B in the system is associated with a unique identifier and includes one or more sensors (not shown) adapted to measure parameters of the wheel and a battery (not shown) for supplying power to those sensors. For example, those sensors can make it possible to measure either pressure or the temperature in the interior inflation space or the acceleration of the module 100B.

Each electronic measuring module 100B is configured to send the electronic control unit 5B over a radio communication link L1 the measurements made by the sensor or sensors in messages termed "measurement" messages coded in a radio signal. By "send measurement messages" is meant that an electronic measuring module 100B sends signals including measurement messages into which are inserted measurements made by one or more sensors of the module 100B.

The communication link L1 is a radio-frequency link, for example operating at a frequency of 433 MHz, employing frequency shift keying (FSK), a data rate of 19.2 kbit/s and Manchester type coding of the data. The sending of radio signals in which messages are coded being known in itself, it will not be described further here.

According to the invention, and referring to FIG. 5, each electronic measuring module 100B is configured to determine a set 200 of proximity scores with respect to the other modules 100B of the vehicle 1B and to send the set of proximity scores 200 that has been determined to the electronic control unit 5B.

Figure 4:
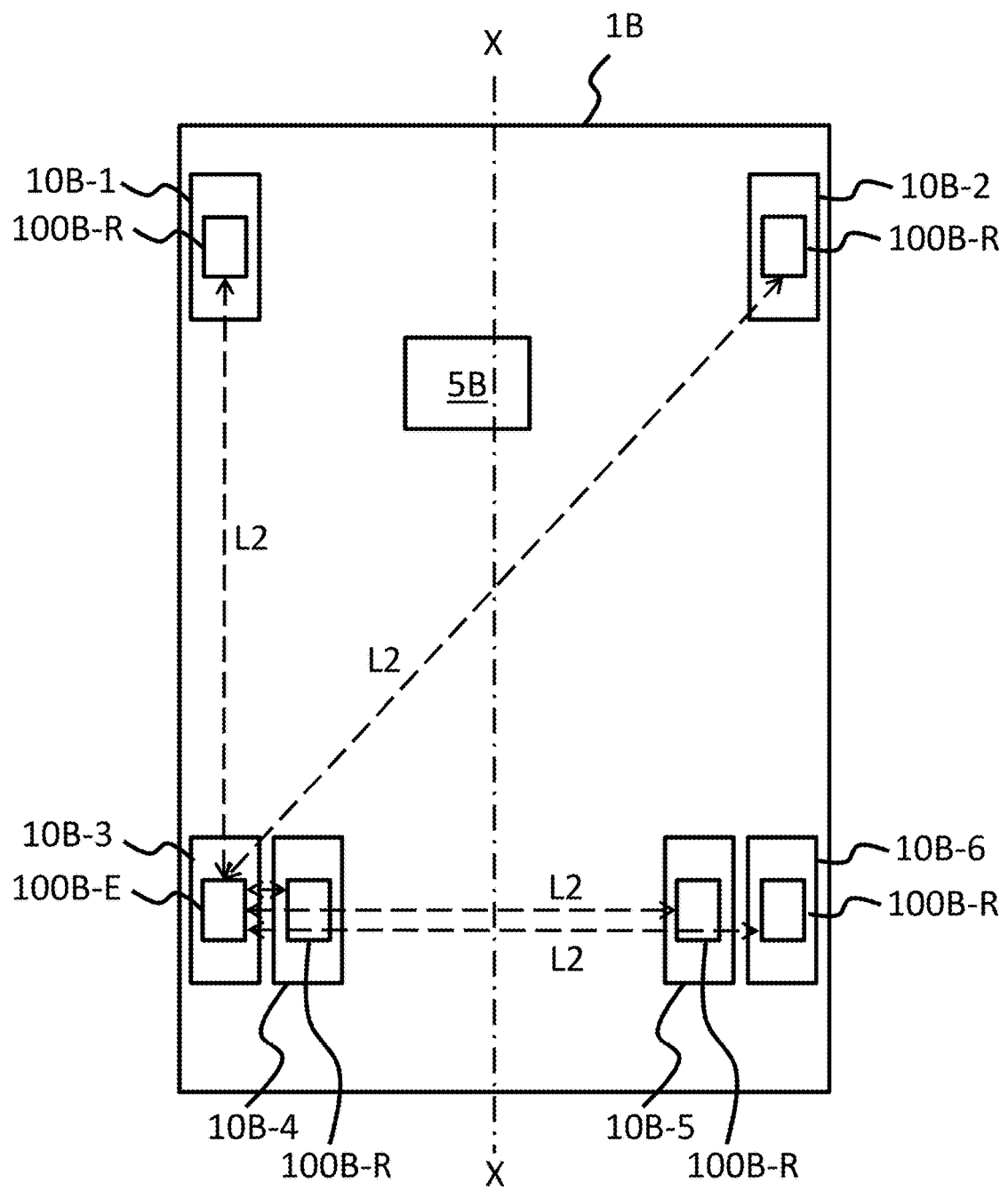
FIG. 4 shows diagrammatically the exchanges effected between a sending module and receiving modules of the vehicle from FIG. 2 during the determination of a set of proximity scores for said sending module.

To this end, and referring to FIG. 4, each module 100B is configured to operate in an initialization mode in which the module is termed a "sender" module 100B-E. In this initialization mode, the sending module 100B-E (the module of the wheel 10B-3 in this example) is configured to send at least one initialization message to other modules, then termed receiving modules 100B-R (mounted in the other wheels 10B-1, 10B-2, 10B-4, 10B-5, 10B-6). This initialization message or each of these initialization messages is coded in radio signals that are sent periodically over a radio communication link L2 at a predetermined power by the sending module 100B-E, the power level changing for each period, for example power levels increasing or decreasing by 0.5 dBm or power levels converging by dichotomy.

The sending module 100B-E can notably be configured to send the initialization message more than once at the same power level.

Moreover, it is accepted that if an initialization message sent in signals sent at a given power is received by a receiving module 100B-R, all the initialization messages sent in signals sent at a higher power will necessarily also be received by said receiving module 100B-R.

The communication link L2 may be of radio-frequency type, for example, using a frequency of 433 MHz, for example, and FSK modulation, a data rate of 19.2 kbit/s and Manchester type coding of the data.

In this example, the initialization message includes the identifier of the sending module 100B-E. It will be noted that the initialization message could further include information on the power at which the signals containing said initialization message are sent in an embodiment of the system described hereinafter.

Each of the receiving modules 100B-R is preferably configured to receive at least one initialization message sent in the signals sent by the sending module 100B-E at at least one of the sending powers and to receive at least one response message including at least the identifier of said receiving module 100B-R. The response message can also include the identifier of the sending module 100B-E received in the initialization message in order to be sure that the response message was sent by a receiving module 100B-R following the reception of an initialization message sent by said sending module 100B-E.

The sending module 100B-E is configured to receive response messages sent by each of the receiving modules 100B-R in order to determine the set of proximity scores with respect to said receiving modules 100B-R.

A response message sent by a receiving module 100B-R includes the identifier of said receiving module 100B-R.

In a preferred embodiment, the sending module 100B-E is configured to determine, as a function of the sending power level, a proximity score for each receiving module 100B-R on receiving its response message.

If the initialization message is sent more than once at the same power level, the receiving module 100B-R is configured to indicate in its response message the number of initialization messages received at a given power. The receiving module 100B-R can delay its response for the time taken to send all the initialization messages at a given power level in order not to respond following the first message received and to allow the possibility of receiving and counting the initialization messages received (at the same power level). In this case, the sending module 100B-E takes account of this additional response time before advancing to another power level.

The sending module 100B-E is preferably configured to determine the proximity score of a receiving module 100B-R from the first response message sent by said receiving module 100B-R corresponding to the sending of signals at the lowest power level when the latter responds to the sending module 100B-E for multiple sending of signals at various power levels. It is indeed the "first level" in terms of time if the sending module transmits successively at increasing power levels. In the case of a sequence of sendings by dichotomy (or by decreasing power levels) the proximity score finally selected corresponds to an intermediate sending in the sequence of successive sendings. In this case, whatever that sequence may be, the response to a message sent at the lowest power is used to determine the proximity score.

In one embodiment, the response message can further include information on the power at which the signals are received by the receiving module 100B-R.

This information can be the power at which the signals are received from the sending module 100B-E or a proximity score, for example as defined above. In the latter case, the sending module 100B-E is configured to insert the value of the power at which the signals sent at a given level are sent and the receiving module 100B-R is configured to measure the power at which said signals are received, to compare that measurement with the sending power whose information is contained in the received initialization message, to determine by calculation the proximity scores with respect to the sending module 100B-E and to send said score to the sending module 100B-E.

Each electronic measuring module 100B is turn and turn about a sending module 100B-E in order to determine a set of proximity scores 200 associated with said module 100B.

The electronic control unit 5B is configured to receive from each module 100B of the vehicle 1B over a communication link L1 a set 200 of proximity scores determined by said module 100B and to determine the location of each module 100B of the vehicle 1B from the sets of proximity scores 200 received.

To this end, and referring to FIG. 2, the electronic measuring modules 100B being disposed symmetrically with respect to the longitudinal axis XX of the vehicle 1B, the position of the electronic control unit 5B is off-center relative to said longitudinal axis XX in order to be closer to one side of the vehicle 1B than the other. This enables the electronic control unit 5B to locate each of the electronic measuring modules 100B in a precise and reliable manner using an algorithm as described hereinafter, the modules 100B on one side of the vehicle 1B being nearer the electronic control unit 5B in terms of distance and therefore of power than the modules 100B on the opposite side. In practice, a position of the electronic control unit 5B can advantageously be selected that, by ad-hoc off-centering, guarantees that the classification of the distances in terms of power corresponds to that of the distances in terms of length.

The electronic control unit 5B can for example determine the location of each module 100B by comparing the sets of proximity scores 200 received.

Figure 7:
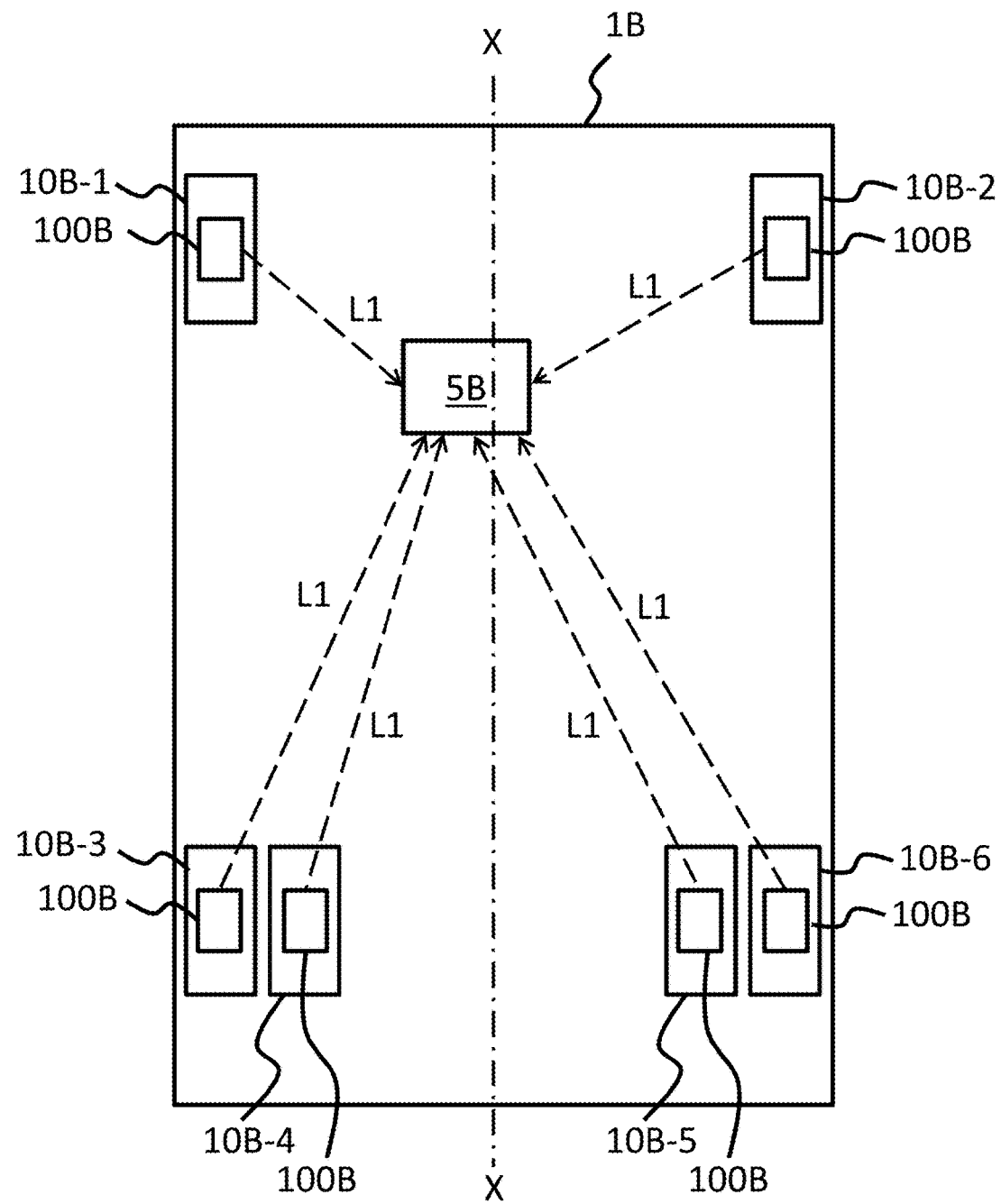
FIG. 7 shows diagrammatically the exchanges effected between the electronic measuring modules and the electronic control unit of the vehicle from FIG. 2 following the determination of a set of proximity scores for each electronic measuring module of the vehicle.

To this end, the electronic control unit 5B must know beforehand the arrangement of the vehicle 5B, that is to say the number and the grouping of the wheels 10B of the vehicle 1B (two wheels 10B-1 and 10B-2 at the front and two groups of twinned wheels 10B-3, 10B-4 and 10B-5, 10B-6 in the example from FIGS. 2, 4 and 7). This knowledge of the arrangement also includes the theoretical relative distance in terms of power (for example in arbitrary units) of each wheel 10B relative to the electronic control unit 5B and of the wheels 10B relative to one another. There is preferably used an NP linear optimization algorithm based on a known correspondence graph. Each node of the graph represents a potential correspondence between an identifier of an electronic measuring module 100B and the position of the associated wheel 10B. The arcs between nodes represent the distances between positions. Inconsistent arcs, because of a mismatch between the reference distances known for these two positions, and the distances established by the modules 100B between them, are eliminated. Only potential solutions are finally retained. The location is obtained by the determination of the complete sub-graph of maximum size (this nominally corresponds to the number of wheels 10B of the vehicle 1B), that is to say the one that establishes the best correspondence between the reference structure and the structure as reported by the set of modules 100B.

The invention is described next with reference to FIGS. 2 to 7 in its implementation with increasing sending power levels.

Referring to FIG. 2, in a step E1 (termed the initialization step or the determination of sets of proximity scores step), each electronic measuring module 100B is turn by turn a sending module 100B-E that determines its set of proximity scores 200 with the other modules 100B (that is to say the receiving modules).

The FIG. 7 nonlimiting example illustrates the determination of a set of proximity scores for the module 100B of the wheel 10B-3, which is therefore at this moment a sending module 100B-E, the modules 100B mounted in the other wheels 10B-1, 10B-2, 10B-4, 10B-5 and 10B-6 being at this time receiving modules 100B-R.

The determination of a set of proximity scores 200 by a sending module 100B-E comprises a plurality of substeps.

Accordingly, in a substep E1A (termed the initialization message sending step), the sending module 100B-E sends a series of signals at different, increasing powers to the receiving modules 100B-R over a communication link L2. The same initialization message is coded in each group of signals, that is to say sent at each power level. These power levels may for example be at 1 µW intervals starting from 1 µW (that is to say 1, 2, 3, . . . µW) at a signal sending frequency of 433 MHz.

In a preferred embodiment the initialization message includes the identifier of the sending module 100B-E.

For a given receiving module 100B-R there are two alternatives for each sending by the sending module 100B-E. Either the power at which the signals are sent is too low (that is to say the receiving module 100B-R is at too great a distance) and the receiving module 100B-R does not receive the initialization message and therefore does not respond to it. In this case, the sending module 100B-E considers that the receiving modules 100B-R that have not responded have not received the initialization message sent in the signals sent at a given power if a predefined maximum time-delay is reached. Or the power at which the signals are sent is sufficiently high and some of the receiving modules 100B-R that have not yet responded do respond (like those that are nearer).

Accordingly, in a substep E1B (termed the initialization message receiving step), some or all of the receiving modules 100B receive at least one initialization message sent by the sending module 100B-E over the associated bidirectional communication link L2.

Also, as soon as a receiving module 100B-R has received an initialization message, it analyses said message and in a substep E1C (termed the response message sending step) sends a response message to the sending module 100B-E over the associated communication link L2, which is received in a substep E1D (termed the response message receiving step).

This response message includes the identifier of the receiving module 100B-R.

When it receives a response message, the sending module 100B-E checks the identifier of the receiving module 100B-R that sent that response message. If the response message is the first response message received by the sending module 100B-E for that receiving module 100B-R, it determines a proximity score for said receiving module 100B-R associated with the sending power level.

The set of proximity scores of the sending module 100B-E with the other receiving modules 100B-R is generated when all the receiving modules 100B-R have responded or all the predetermined sending power levels have been tested.

FIGS. 5 and 6 show an example of a table grouping the sets of proximity scores for the six wheels of the vehicle 1B. In this example the references of the modules 100B have been replaced by letters (A, B, C, D, E, F, G) for clarity.

Accordingly, and referring to FIG. 6, during the step E1 of initializing the module F (sending module 100B-E), the module F sends signals at a first power level, for example 1 µW, and then waits for a possible response message for a predetermined time interval beyond which the sending module 100B-E considers that the receiving modules 100B-R are out of range.

In this example, the module E that receives the initialization message contained in the signals then sends a response message to the module F. On receiving it, the module F determines a proximity score S1 of 6 (the highest score) associated with the first level for the module E. The module F then sends signals at a second power level, for example 2 µW, but no receiving module 100B-R (other than the module E) responds during the predetermined time interval and no module is therefore assigned the proximity score S2 of 5 associated with the second power level. Similarly, the module F then sends signals at a third power level, for example 3 µW, but no receiving module 100B-R (other than the module E) responds during the predetermined time interval and no module is therefore assigned the proximity score S3 of 4 associated with the third power level.

Each time, for this second level and this third level, once the predetermined time interval has elapsed the sending module 100B-E considers that the receiving modules 100B-R that have not responded are out of range of the sending module 100B-E for that sending power (it is therefore a question of increasing it). For this second level and this third level, it is agreed that the module E continues to respond because it receives the initialization messages but given that it has already been evaluated as being the nearest one (score of 6), the sending module F ignores these additional responses.

The module F then sends signals at a fourth power level, for example 4 µW, and then waits for a potential response message during a predetermined time interval. The module D that received the initialization message contained in these signals then sends a response message to the module F. On receiving it, the module F determines a proximity score S4 of 3 associated with the fourth level for the module D. The module F then sends signals at a fifth power level, for example 5 µW, and then waits for a potential response message during a predetermined time interval. The module C that received the initialization message contained in these signals then sends a response message to the module F. On receiving it, the module F determines a proximity score S5 of 2 associated with the fifth level for the module C. The module F then sends the signals at a sixth power level, for example 6 µW, and then waits for a potential response message during a predetermined time interval. The module A that received the initialization message contained in these signals then sends a response message to the module F. On receiving it, the module F determines a proximity score S6 of 1 associated with the sixth level for the module A, and so on. Thus the module F tests all the predefined power levels (for example from 1 to 14 µW in steps of 1 µW) and then generates its set of proximity scores 200 as shown in FIG. 5. The module B, which is that at the greatest distance, not having received signals from the module F, it has not sent it response messages, with the result that it does not appear in the set of proximity scores 200 for said module F. Alternatively, the module F could cease to send when all the other receiving modules 100B-R have responded even if not all the predefined power levels have been tested.

Each electronic measuring module 100B of the vehicle 1B becomes in its turn a sending module and carries out the initialization step E1 in order to generate its own set of proximity scores 200.

Then, in a step E2 (termed the set of proximity scores sending step), as shown in FIG. 7, each module 100B of the vehicle 1B sends over a communication link L1 the set of proximity scores 200 that it determined in the step E1 to the electronic control unit 5B which receives it in a step E3 (termed the set of proximity scores receiving step). At this stage, the electronic control unit 5B has available a table containing all the sets of proximity scores 200 as shown in FIG. 5.

Finally, in a step E4 (termed the location step), the electronic control unit 5B determines the location of each module 100B from the sets of proximity scores 200 received using for example an NP linear optimization algorithm and graph theory as described above.

The method according to the invention enables the electronic control unit 5B to determine in a simple and effective manner the location of the electronic measuring modules 100B in order to inform the driver of the vehicle at the dashboard 20 of a fault in one of the wheels if necessary.

It is moreover specified that the present invention is not limited to the examples described above and lends itself to numerous variants that will be evident to the person skilled in the art.

The invention claimed is:

1. A method of locating a plurality of electronic measuring modules mounted in wheels of a motor vehicle, said vehicle including an electronic control unit of said electronic measuring modules, the method comprising:

determining, by each electronic measuring module, a set of proximity scores with respect to the other modules;

sending, by each module, all the proximity scores that have been determined to the electronic control unit;

receiving, by the electronic control unit, the sets of proximity scores that have been sent;

determining the location of each module with respect to a respective one of the wheels by the electronic control unit from the sets of proximity scores received; and displaying, on a display of the vehicle, information relating to the wheels of the vehicle based on the determined location of each module in a respective wheel of the vehicle, wherein the determining, by each electronic measuring module, the set of proximity scores with the other modules is performed in turn by each module and comprises, for each module:

sending, by the module that is a sending module, at least one initialization message to the other modules that are receiving modules, said initialization message being coded in radio-frequency signals sent at increasing power levels and including the identifier of the sending module, receiving, by each of the receiving modules, the at least one initialization message sent by the sending module, sending, by each of the receiving modules, at least one response message including the identifier of said receiving module, and receiving, by the sending module, the response messages sent by each of the receiving modules in order to determine the set of proximity scores with respect to said receiving modules.

2. A method of locating a plurality of electronic measuring modules mounted in wheels of a motor vehicle, said vehicle including an electronic control unit of said electronic measuring modules, the method comprising:

determining, by each electronic measuring module, a set of proximity scores with respect to the other modules;

sending, by each module, all the proximity scores that have been determined to the electronic control unit;

receiving, by the electronic control unit, the sets of proximity scores that have been sent;

determining the location of each module with respect to a respective one of the wheels by the electronic control unit from the sets of proximity scores received; and displaying, on a display of the vehicle, information relating to the wheels of the vehicle based on the determined location of each module in a respective wheel of the vehicle, wherein the determining, by each electronic measuring module, the set of proximity scores with the other modules is performed in turn by each module and comprises, for each module:

sending, by the module that is a sending module, at least one initialization message to the other modules that are receiving modules, said initialization message being coded in radio-frequency signals sent at increasing power levels and including the identifier of the sending module, receiving, by each of the receiving modules, the at least one initialization message sent by the sending module, sending, by each of the receiving modules, at least one response message including the identifier of said receiving module, and receiving, by the sending module, the response messages sent by each of the receiving modules in order to determine the set of proximity scores with respect to said receiving modules, wherein the sending module determines a proximity score for each receiving module following the reception of the response message sent by said receiving module, the proximity score being a value corresponding to the power level at which the sending module sent the signals including the initialization message.

3. A method of locating a plurality of electronic measuring modules mounted in wheels of a motor vehicle, said vehicle including an electronic control unit of said electronic measuring modules, the method comprising:

determining, by each electronic measuring module, a set of proximity scores with respect to the other modules;

sending, by each module, all the proximity scores that have been determined to the electronic control unit;

receiving, by the electronic control unit, the sets of proximity scores that have been sent;

determining the location of each module with respect to a respective one of the wheels by the electronic control unit from the sets of proximity scores received; and displaying, on a display of the vehicle, information relating to the wheels of the vehicle based on the determined location of each module in a respective wheel of the vehicle, wherein the determining, by each electronic measuring module, the set of proximity scores with the other modules is performed in turn by each module and comprises, for each module:

sending, by the module that is a sending module, at least one initialization message to the other modules that are receiving modules, said initialization message being coded in radio-frequency signals sent at increasing power levels and including the identifier of the sending module, receiving, by each of the receiving modules, the at least one initialization message sent by the sending module, sending, by each of the receiving modules, at least one response message including the identifier of said receiving module, and receiving, by the sending module, the response messages sent by each of the receiving modules in order to determine the set of proximity scores with respect to said receiving modules, wherein the proximity score of a receiving module is determined from the first response message received corresponding to the sending of signals at the lowest power level by the sending module when the sending module receives a plurality of response messages from said receiving module corresponding to a plurality of signals sent at different power levels.

* * * * *